Dec. 5, 1939. L. G. TUBBS 2,182,650
REGULATOR CONTROL EQUIPMENT
Original Filed June 30, 1936
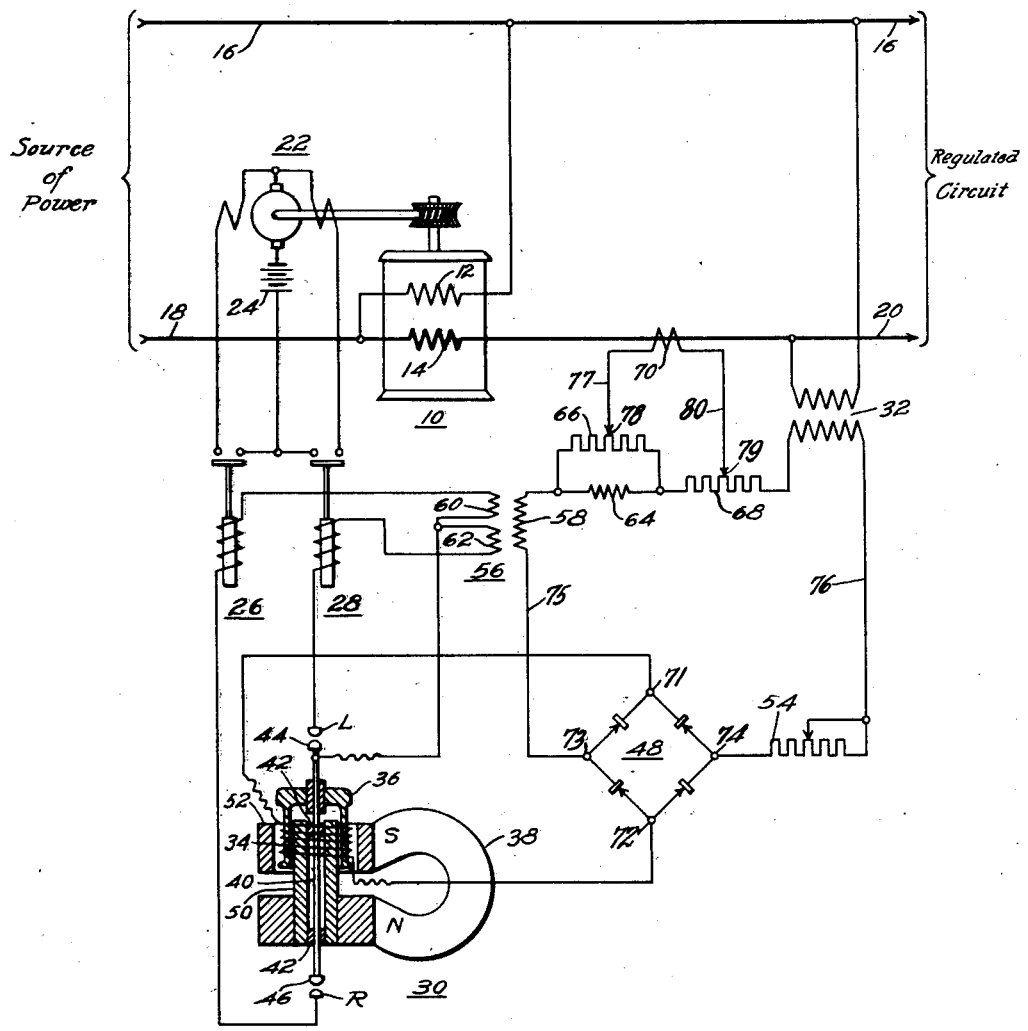
WITNESSES:
C. J. Weller.
F. E. Hardy
INVENTOR
Lester G. Tubbs.
BY
Ezra W. Savage
ATTORNEY Patented Dec. 5, 1939

2,182,650

UNITED STATES PATENT OFFICE 2,182,650

REGULATOR CONTROL EQUIPMENT

Lester G. Tubbs, Wilkinsburg, Pa., assignor to Westinghouse Electric & Manufacturing Company, East Pittsburgh, Pa., a corporation of Pennsylvania Original application June 30, 1936, Serial No. 88,142. Divided and this application June 9, 1937, Serial No. 147,310

5 Claims. (Cl. 171—119)

My invention relates to regulator control equipment and it has particular relation to apparatus for controlling the operation of induction feeder voltage regulators.

An object of my invention is to simplify the equipment, reduce the cost and size of the structure and improve the performance of equipment of this character.

Another object of my invention is to provide a line drop compensator to compensate the regulator for reactive and ohmic voltage drop in the feeder circuit.

Further objects and advantages of my invention will be apparent from the following description of a preferred embodiment of the invention.

This application is a division of my copending application Serial No. 88,142, filed June 30, 1936, for improvements in regulator control equipment and assigned to the same assignee as this application.

The single figure is a diagrammatic view of apparatus and circuits representing my improved control equipment applied to an induction regulator of conventional design.

In the drawing, I have shown a conventional regulator at 10 having relatively movable inductively coupled windings 12 and 14. These windings are interconnected in the manner shown between a source of alternating current power, designated by conductors 16—18, and a feeder or other load circuit 18—20 in which it is desired that the voltage be maintained constant.

The regulator is equipped with an operating motor 22 which serves to adjust the magnetic coupling between the shunt winding 12 and the series winding 14 thereby to alter the magnitude or phase position of the corrective voltage introduced between conductors 18 and 20. When energized from a suitable source 24 by the actuation of a control contactor 26, the motor operates the regulator 10 in the circuit-voltage-raising direction. When similarly energized by the actuation of a second contactor 28, the motor operates the regulator in the opposite or circuit-voltage-lowering direction.

A primary relay 30 is utilized selectively to control these two contactors. This relay is energized through a transformer 32 by a measure of the voltage of the regulator circuit 16—20.

In accordance with my invention, I provide a highly novel and improved design for this relay which is more compact, lower in cost and requires for operation only about 5% of the energy consumed by corresponding relay devices of conventional or prior art design.

In the preferred embodiment illustrated, the actuating winding 34 of the relay is supported by a hollow cylindrical sleeve member 36, in a unidirectional magnetic field which is produced by a permanent magnet 38 shown as being of the horseshoe type. This supporting sleeve is carried by a rod 40 which is vertically movable in a pair of guide bearings 42 and which carries contact members 44 and 46 at its upper and lower ends. The winding 34 is connected to terminals 71 and 72 of a full-wave rectifier to be energized by a uni-directional measure of the regulated circuit voltage supplied from the aforementioned transformer 32 through a voltage indicating circuit extending from the secondary winding of the transformer 32 to the alternating current terminals 73 and 74 of the rectifier 48 through conductors 75 and 76.

The lower pole piece of magnet 38 is extended, by a cylindrical member 50 of magnetic material, into the hollow portion of the winding supporting sleeve 36. The upper pole piece of the magnet carries a ring attachment 52 which surrounds the winding 34, causing the uni-directional flux of the magnet to thread through the winding turns in passing from member 50 to member 52 therewithout.

The operation of primary relay 30 will have become more or less apparent from the foregoing description. The uni-directional current supplied through transformer 32 and rectifier 48 causes the winding 34 to exert an upwardly acting force upon contact-carrying rod 40. When the voltage of circuit 16—20 is of the desired value, this force exactly overcomes the weight of the vertically movable assemblage and maintains it in the illustrated mid or disengaged contact position.

Should, however, the voltage of circuit 16—20 decrease, the resulting reduction in this upward force allows rod 40 to move downwardly bringing contact member 46 into engagement with a cooperating stationary member R. This completes an actuating circuit for contactor 26 and causes motor 22 correctively to operate regulator 10 in the voltage raising direction. In a similar manner, should the circuit voltage exceed the desired value, the increased upwardly acting force of winding 34 brings the upper contact 44 into engagement with a cooperating member L to actuate contactor 28 and thereby cause the motor 22 correctively to adjust the regulator in the voltage lowering direction.

To adjust the magnitude of the regulated voltage to be maintained between conductors 16 and 20, I include a rheostat 54 in the voltage indicating circuit. As more resistance is cut in, the relay requires that the regulator maintain a higher value of voltage in circuit 16—20. Reduction of the rheostat resistance similarly lowers the magnitude of this voltage.

In order to increase the pressure of contact engagement of the device 30, I utilize an inductive type of compounding arrangement which operates in the relay supply circuit. This replaces the usual magnetic devices which mechanically operate on the movable contact carrying member of the relay. In the arrangement shown, a measure of the current supplied to device 30 is utilized as the source of actuating current for the regulator control contactors 26 and 28. A coupling transformer 56 constitutes the energy-transferring and compounding-action producing element.

It comprises a primary winding 58 series connected in the input circuit of rectifier 48, and a pair of secondary windings 60 and 62, respectively, included in the circuits of the motor control contactors. The ampere turns of all three of these windings are substantially matched. In operation, the impedance of winding 58 is so altered by a completion of either of the other winding circuits as to increase the engagement pressure between the particular set of primary relay contacts which effected this completion.

Thus, when members 44 and L engage, the resulting current drawn by winding 62 acts to lower the impedance of winding 58 and slightly raise the current supplied to winding 34 of device 30. Likewise, when contacts 46 and R engage, the resulting current drawn from winding 60 acts to raise the impedance of its winding thereby slightly lowering the current supplied to the actuating winding of primary relay 30.

To compensate for the voltage line drop in the feeder circuit 16—20 necessary to maintain a desired voltage at a point remote from the induction regulator, I provide a compensator in the voltage indicating circuit for varying the energization of the primary relay 30 in accordance with the line drop in voltage between the regulator and a desired distribution point of the feeder circuit. This compensator comprises a fixed reactor 64 without taps to which a resistor 66 is connected in shunt relation, and in series with which a resistor 68 is provided. The resistor 68 is provided to introduce the ohmic component of voltage line drop into the voltage indicating circuit and the reactor 64 to introduce the reactive or wattless component of voltage line drop into the circuit. A current transformer 70 is provided for supplying current to a current indicating circuit that is a measure of the current in the conductor 20. This circuit extends from one terminal of the secondary winding of the transformer 70 through conductor 77, a selected portion of the resistor 66 determined by the position of the movable contact 79, a selected portion of the resistor 68 determined by the position of the adjustable contact 79, and the conductor 80 to the other terminal of the secondary winding of the current transformer 70. The adjustments of the points of connection of the secondary winding of the current transformer 70 determines the amount of reactive and ohmic line drop compensation respectively that is introduced into the voltage indicating circuit through which the primary relay is energized. Current from the transformer 70 flowing through the compensator circuit provides components of voltage that are proportional to the current in the regulated circuit represented by conductors 16, 20 and has the same power factor relative to the voltage of the feeder circuit. These reactive and ohmic components of voltage are introduced into the voltage indicating circuit in such vector relations as to reduce the voltage applied to the primary relay winding below that of the voltage transformer 32 by an amount that is proportional to the reactive and ohmic components of line drop between the point of connection of the transformer 32 to the feeder circuit and the distant point with respect to which compensation is desired.

A compensator is, in effect, a duplication in miniature of the circuit from the regulator 10 to the distant point of load distribution at which it is desired that the voltage be maintained constant. From a measure of the combined drop through the resistance and reactance elements 64 and 68 introduced into the supply circuit of primary relay 30, the regulator adjusts itself to vary to voltage at the regulator with varying load to maintain the desired voltage at the point of distribution.

The prior art forms of variable reactance utilized in compensating circuits are comparatively expensive. They require either a large number of taps and a selecting switch or a pair of variably coupled windings. In accordance with my invention, these are replaced by the aforementioned fixed reactor 64 and a shunting rheostat which preferably has about 10 times the impedance of the reactor.

By altering the setting of the rheostat, a varying portion of the compensating current may be shunted from the reactor. A range of control of from zero to about 90% of the compensating current may be realized by the above combination. The angular error introduced by the rheostat is comparatively small and of a direction tending to neutralize the angular error of the current transformer 70. Hence, by correlating the transformer design with that of the reactance element, an accuracy comparable to that of conventional compensators may readily be attained.

Although I have shown and described a specific embodiment of my invention, I am fully aware that many modifications thereof are possible. My invention, therefore, is not to be restricted except insofar as is necessitated by the prior art and by the scope of the appended claims.

I claim as my invention:

1. In combination, an electric circuit, means responsive to the voltage of said circuit, means including a voltage responsive circuit for applying a voltage to said voltage responsive means that is a measure of the voltage of said electric circuit, a line drop compensator for compensating said voltage responsive means for voltage drop in a portion of said electric circuit, comprising a fixed reactor and a resistor connected in series circuit relation in said voltage responsive circuit, a resistor having an impedance of the order of 10 times the impedance of said reactor connected in parallel circuit relation to said reactor and means for applying a voltage between adjustable points on said two resistors that is a measure of the current in said electric circuit.

2. A device for compensating for the ohmic and reactive voltage drops in an electric circuit comprising a compensating resistor connected in series circuit relation with an untapped fixed reactor, a shunting resistor connected in parallel circuit relation to said reactor, and means for introducing a current that is a measure of the current in said circuit being compensated to flow between a selected point on said shunting resistor and a selected point on said ohmic resistor.

3. In combination, an electric circuit, voltage responsive means, a voltage responsive circuit for energizing said voltage responsive means and supplied with electric energy at a voltage that is a measure of the voltage of said electric circuit, compensating means for introducing a voltage component into said voltage responsive circuit that is proportional to the reactive voltage drop in said electric circuit comprising a reactor connected in series in said voltage responsive circuit, a resistor in parallel circuit relation to said reactor, a current transformer and an output circuit supplied therefrom, and means including an adjustable contact for connecting a selected portion of said resistor in said output circuit with current that is a measure of the current in said first-named electric circuit.

4. In combination, an electric circuit, voltage responsive means, a voltage responsive circuit for energizing said voltage responsive means and supplied with electric energy at a voltage that is a measure of the voltage of said electric circuit, compensating means for introducing a voltage component into said voltage responsive circuit that is proportional to the reactive voltage drop in said electric circuit comprising a reactor connected in series in said voltage responsive circuit, a resistor in parallel circuit relation to said reactor, a current responsive circuit supplied with electric energy at a current value that is a measure of the current in said electric circuit, and means including an adjustable contact for including a selected portion of said resistor in said current responsive circuit.

5. In combination, an electric circuit, voltage responsive means, a voltage responsive circuit for energizing said voltage responsive means and supplied with electric energy at a voltage that is a measure of the voltage of said electric circuit, compensating means for introducing voltage components into said voltage responsive circuit that are proportional, respectively, to the reactive and ohmic voltage drops in said electric circuit comprising a fixed reactor and a fixed resistor connected in series in said voltage indicating circuit, a fixed resistor in parallel circuit relation to said reactor, a second circuit supplied with electric energy at a current value that is a measure of the current in said electric circuit, and means for including adjustable selected portions of said series and parallel resistors in said second circuit.

LESTER G. TUBBS.